United States Patent Office 3,018,700
Patented Jan. 30, 1962

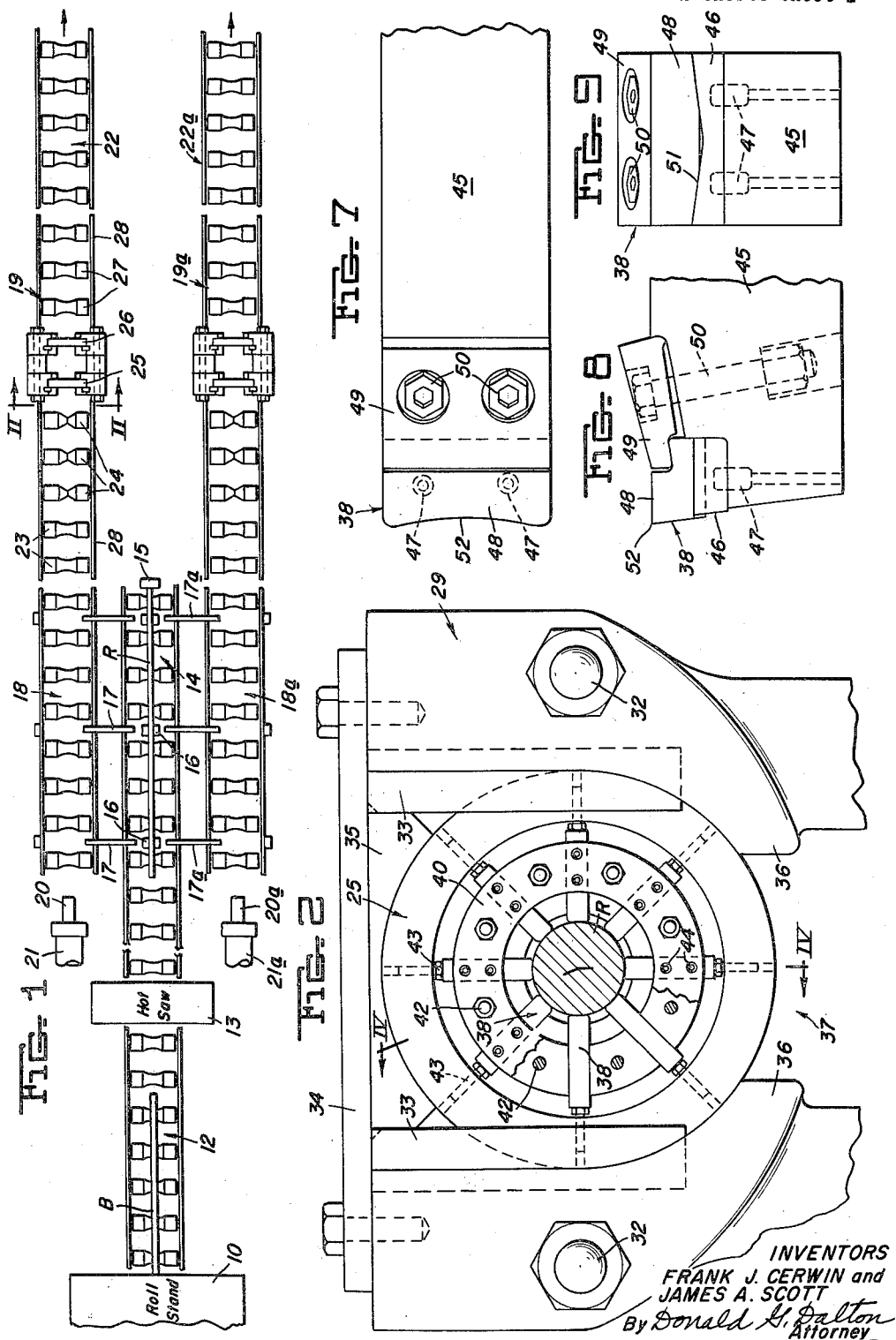

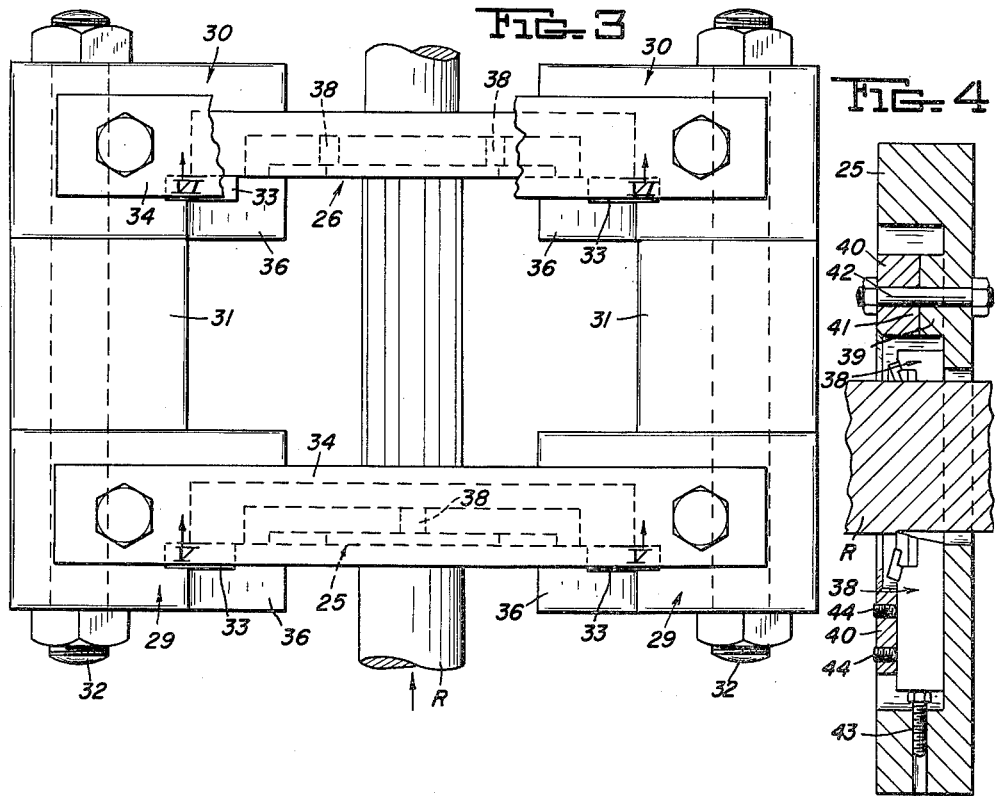
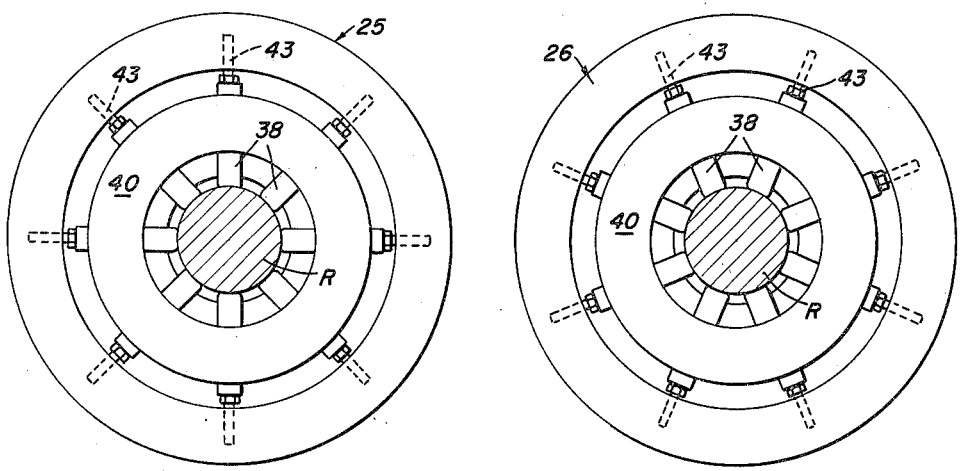

3,018,700
PEELING APPARATUS AND METHOD
Frank J. Cerwin, McKeesport, and James A. Scott, Pittsburgh, Pa., assignors to United States Steel Corporation, a corporation of New Jersey
Filed Sept. 15, 1959, Ser. No. 840,138
1 Claim. (Cl. 90—24)

This invention relates to an improved method and apparatus for peeling surface layers from elongated semifinished metal shapes, such as tube rounds.

The invention is particularly applicable to the manufacture of seamless tubing, where common practice is to roll a steel ingot down to a round bar of appropriate diameter and saw it to appropriate lengths while still hot. Next the bar usually is cooled and its outer surface peeled off to remove defective portions. Thereafter the bar or "round" is reheated, pierced and otherwise finished. Cooling and reheating work from a cold temperature of course are extra operations which would be desirably eliminated, but it has been considered necessary to peel the work only when it is cold. Nevertheless the invention is not limited to seamless tubing manufacture, but may have application to other forms of work where similar problems are encountered.

An object of the present invention is to provide an improved peeling apparatus and method in which surface layers are peeled from work while the latter is still hot, such as from tubing rounds immediately after they are rolled and cut to length.

A more specific object is to provide an improved peeling apparatus and method in which hot elongated semifinished steel shapes are guided and pushed through cutting tools immediately after they are rolled and cut to length.

A further object is to provide an improved bench which includes tools adapted to peel surface portions from a hot semifinished steel shape as the latter is guided and pushed through the tools.

In accomplishing these and other objects of the invention, we have provided improved details of structure, a preferred form of which is shown in the accompanying drawings, in which:

FIGURE 1 is a somewhat diagrammatic top plan view of an apparatus layout in accordance with our invention;

FIGURE 2 is a vertical cross section on a larger scale taken on line II—II of FIGURE 1 and showing one of our tool-supporting rings;

FIGURE 3 is a top plan view of our tool-supporting rings on a scale similar to FIGURE 2;

FIGURE 4 is a section on line IV—IV of FIGURE 2;

FIGURE 5 is a somewhat diagrammatic sectional view of our front tool-supporting ring taken on line V—V of FIGURE 3 to show the tool orientation;

FIGURE 6 is a similar view of our back tool-supporting ring taken on line VI—VI of FIGURE 3;

FIGURE 7 is a front elevational view of one of our cutting tools on a still larger scale;

FIGURE 8 is a side elevational view of the tool shown in FIGURE 7; and

FIGURE 9 is an end elevational view of this tool.

FIGURE 1 shows a portion of a conventional bar rolling mill which includes a final roll stand 10 adapted to reduce hot semifinished steel shapes to round bars B, a powered roller conveyor 12 for carrying hot bars from the roll stand, a hot saw 13 for cutting the bars to appropriate lengths R known in the art as "rounds," and another powered roller conveyor 14 for carrying rounds from the saw. A stop 15 is mounted at the end of conveyor 14 in a position to be engaged by the leading end of each round. Conventional kickout devices 16 are mounted between rollers of conveyor 14 for ejecting the rounds from this conveyor sideways onto skids 17 or 17a on opposite sides after each round has engaged stop 15. For small sizes (for example 5½ inches diameter and under on some mills) the kickout devices eject successive rounds in opposite directions, that is, alternately to skids 17 and skids 17a. For larger sizes the kickout devices can eject all the rounds in one direction, and duplicate equipment on the other side can be used for standby purposes. Skids 17 and 17a extend to idler roller conveyors 18 and 18a respectively on opposite sides of conveyor 14.

In accordance with the present invention, conveyors 18 and 18a are positioned in alignment with benches 19 and 19a respectively at the entry ends thereof. Suitable mechanisms are associated with the benches for forcing the work in an axial direction through the benches, either by pushing or pulling, and thus peeling the outer surface layers of the work. For this purpose we have illustrated rams 20 and 20a positioned ahead of conveyors 18 and 18a and adapted to engage trailing ends of rounds thereon to push them through the respective benches, and hydraulic cylinders 21 and 21a for driving the rams. Powered roller conveyors 22 and 22a are situated at the exit ends of the benches to receive the peeled work.

Since our two benches 19 and 19a are of like construction, we describe only one of them in detail. Our bench 19 comprises two or more grooved idler rollers 23 journaled adjacent its entry end, guide means 24, aligned front and back tool-supporting rings 25 and 26, and a series of grooved powered rollers 27 journaled adjacent its exit end. The guide means 24 illustrated includes three sets of upper and lower pairs of grooved idler rollers whose grooves define a pass aligned with the two rings, but obviously numerous equivalents are possible, such as fixed rings. The bearings in which the various rollers are journaled are mounted on any suitable supports, such as the vertical plates 28 illustrated.

As best shown in FIGURES 2 and 3, our front and back tool-supporting rings 25 and 26 are mounted in respective housings 29 and 30. Spacers 31 separate the two housings, and longitudinal bolts 32 extend through the housings and spacers to form a rigid assembly. The spacing is sufficient that the front ring does not interfere with chips which the back ring cuts from the work. Vertically extending keys 33 are received in keyways in the housings and extend over the faces of the rings on the entry side to fix the rings in the housings. Cover plates 34 extend across the housings and are bolted thereto, and on their undersides carry integral fillers 35 which bear against the tops of the respective rings. The faces of the rings on the exit side bear directly against the housings to transmit thrust loads thereto. The undersides of the rings rest on integral curved extensions 36 of the housings. The spaces between these extensions are open, as indicated at 37, to enable chips peeled from the work to drop from the bench.

Each tool-supporting ring carries a plurality of spaced peeler tools 38, eight in number in the illustration. The tools extend radially and are uniformly angularly spaced around each ring. As shown in FIGURES 5 and 6, the tools carried by each ring are aligned with the spaces between tools carried by the other ring, whereby the tools on the two rings cover the full circumference of the work. As shown in FIGURES 2 and 4, each ring is dished toward its entry side. Within its dished face each ring carries a series of integral arcuate lugs 39 uniformly spaced in a circular pattern. The tools 38 fit within the spaces between the lugs. A clamping ring 40 overlies the tools 38 and lugs 39 and itself has lugs 41 which mate with and bear against lugs 39. A plurality of bolts 42 fix each clamping ring 40 to its respective ring 25 or 26. Tools 38 are further held in place by radially extending backing screws 43 threadedly engaged with the tool-supporting rings and by set screws 44 threadedly engaged with the clamping rings. Within limits, the positions of the tools can be adjusted to vary the depth of cut or to accommodate work of different diameter by adjustment of the backing screws.

As shown in FIGURES 7, 8 and 9, each of our tools 38 includes a shank 45, an anvil or shim 46 positioned in a recess on the entry face of the shank by pins 47, a cutting tip 48 overlying the anvil, and a clamp plate 49 and bolts 50 holding the tip in place. The outer face of the anvil preferably contains a shallow V-shaped groove 51 longitudinal with the long dimension of the shank, while the inner face of the tip has a complementary ridge (FIGURE 9). The tip has a cutting edge 52, which preferably is concave to conform with the surface of the work. Preferably the exposed face of the tip toward the entry side is normal to the work; that is, the tip has a rake angle of 0°, although the rake angle can vary from extremes of about plus 4° to minus 4°. These angles are fairly critical; excessive positive rake pulls the work into the tools, while excessive negative rake tends to upset the work. The cutting tip protrudes at least ⅜ inch beyond the clamp plate, and the slope of the face of this plate from the face of the tip should not exceed 15°. The shank 45 preferably is of a "heavy metal," for example a sintered tungsten mixture, which retains its strength at the high temperatures encountered in the process and has a low coefficient of thermal expansion enabling it to retain its position for support of the tip despite temperature changes. Alternatively the shank can be of hot die steel or other materials which retain their strength at high temperatures. The cutting tip is also of a hard material, for example a combination of metal carbides sintered with a metallic binder. We have successfully used cutting tips formed of a mixture of tantalum and tungsten carbides sintered with a cobalt binder.

According to our preferred peeling method, hot semi-finished steel workpieces, such as tube rounds R, feed singly to roller conveyor 18 (or 18a). Ram 20 engages the trailing end face of each workpiece and pushes it through the guide means 24 and the tool-supporting rings 25 and 26. The work is at a temperature of about 1200 to 1900 F. at which it is quite ductile. The guide means centers the work with respect to the rings, and the forces applied through the cutting tips 48 are in a direction and of amplitude sufficient to maintain the work in a central position and prevent jamming and in fact will straighten crooked workpieces. The tools 38 of the front ring 25 peel longitudinal chips from the surface, leaving unpeeled areas between the chips. The tools of the back ring 26 then peel the areas which the first tools left unpeeled. In each instance the tools peel normally to a depth of about ⅟₁₆ inch, sufficient to eliminate surface defects, but may remove as much as ⅜₁₆ inch.

When we practice our method as just described, we eliminate any need to cool the work from its hot rolling finishing temperature before peeling its surface. After peeling, the work remains at an elevated temperature, and less reheating is necessary to bring it up to a suitable temperature for further hot work, such as piercing. Thus we overcome the need for cooling equipment, as well as decreasing the size of reheating equipment needed. Removing the surface layer of metal containing defects in the heated state requires considerably less power than in the cold state as is usually done. However, our method and apparatus also can be used to advantage for peeling work which has already cooled if the work is first reheated to about 1200 to 1900 F.; hence we do not wish to limit the invention to use immediately following a rolling operation. Other shapes than rounds easily can be peeled with similar apparatus equipped with appropriate tool-holding devices and with tools of appropriately shaped cutting edges. The only restrictions are that the depth of cut must not produce enough force to upset the cross-sectional area, and that the cross-section of the work be similar from end to end. Therefore as used herein, the term "ring" refers to any tool support which surrounds the work and is not limited to a circular grouping.

While we have shown and described only a single embodiment of the invention, it is apparent that modifications may arise. Therefore, we do not wish to be limited to the disclosure set forth but only by the scope of the appended claim.

We claim:

An apparatus for peeling surface layers from a succession of tube rounds while the rounds are at a temperature of about 1200 to 1900 F. comprising a conveyor adapted to receive each round, a ram adapted to abut one end of the round received on said conveyor and to push the round in an axial direction, a plurality of fixed cutting tools which are arranged in spaced apart first and second rings aligned with said ram, means abutting the back end of each tool and positively supporting the tool in a fixed position in its respective ring, said tools being engageable with the surface of the round throughout its full length to peel longitudinal surface layers to a depth of ⅟₁₆ to ⅜₁₆ inch therefrom as said ram pushes the round thereagainst, the tools of the second ring being arranged to peel areas left unpeeled by the tools of the first ring, and guide means located between said conveyor and the tools of the first ring for initially guiding the round into engagement with the tools of the first ring, said tools thereafter being themselves adapted to apply forces to the round in a direction and of a magnitude to maintain the round in a central position.

References Cited in the file of this patent

UNITED STATES PATENTS

| | | |
|---|---|---|
| 1,198,894 | Cote | Sept. 16, 1916 |
| 1,317,049 | Smith | Sept. 23, 1919 |
| 1,573,454 | Shutz | Feb. 16, 1926 |
| 1,584,674 | Smith | May 11, 1926 |
| 1,689,512 | Worton | Oct. 30, 1928 |
| 2,750,853 | Stevens | June 19, 1956 |

FOREIGN PATENTS

| | | |
|---|---|---|
| 272,339 | Switzerland | Mar. 1, 1951 |
| 906,880 | Germany | Mar. 18, 1954 |